United States Patent [19]

Randolph

[11] 4,443,970

[45] Apr. 24, 1984

[54] PLANT DAUBER

[76] Inventor: Joe G. Randolph, Rte. 1, Shallowater, Tex. 79363

[21] Appl. No.: 84,602

[22] Filed: Oct. 15, 1979

[51] Int. Cl.³ .......................................... A01M 21/00
[52] U.S. Cl. ....................................................... 47/1.5
[58] Field of Search ............. 47/1, 1.43, 1.44, 1.5, 47/1.7, 58, 1.41, 48.5

[56] References Cited

U.S. PATENT DOCUMENTS

| | | | |
|---|---|---|---|
| 2,979,757 | 4/1961 | Smith | 47/1 X |
| 3,728,817 | 4/1973 | Huey et al. | 47/1.41 X |
| 3,959,924 | 6/1976 | Allen | 47/1.7 X |
| 4,206,569 | 6/1980 | Randolph | 47/1.7 |
| 4,208,835 | 6/1980 | Roll et al. | 47/1.5 |

*Primary Examiner*—James R. Feyrer
*Attorney, Agent, or Firm*—Wendell Coffee

[57] ABSTRACT

A contact bar of permeable, absorbant, exudative material such as a paint roller is attached by a spring bar to a mounting bracket. The contact bar is moistened with a treatment liquid such as a herbicide. Each time the contact bar rubs against a plant, additional herbicide is applied to the contact bar, e.g., a spring arm, carrying the contact bar, can be pushed back by the plant against a microswitch, which will open a solenoid valve. The opening of the solenoid valve may apply liquid to the contact bar by spraying the liquid from a nozzle onto the bar or by feeding liquid through a perforated tube under the surface of the material on the contact bar.

2 Claims, 4 Drawing Figures

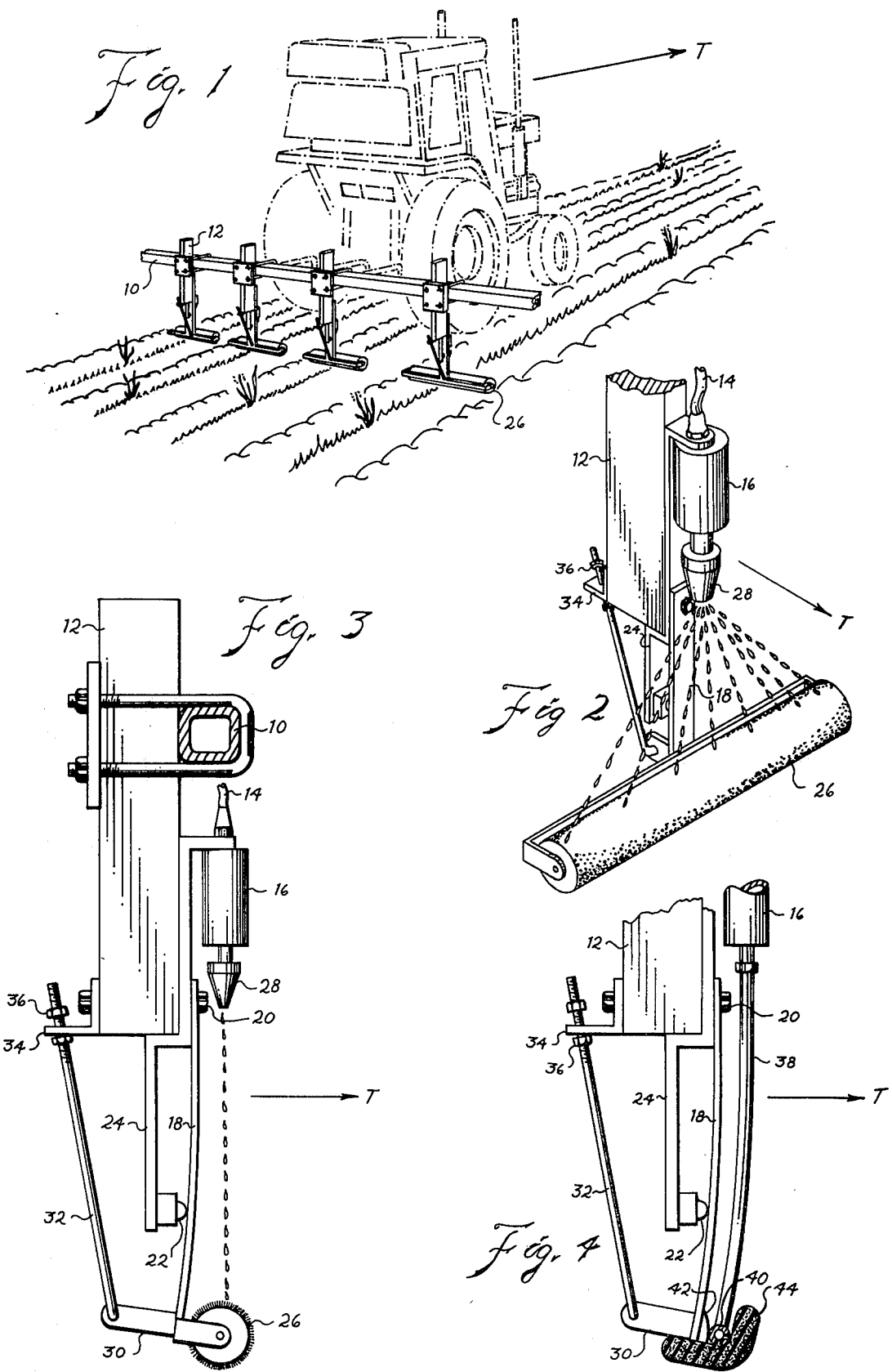

PLANT DAUBER

CROSS REFERENCE TO RELATED APPLICATIONS

This invention has certain similar parts as shown in my previous patent application, Ser. No. 939,807, filed Sept. 5, 1978 entitled WEED SPRAYER, now U.S. Pat. No. 4,206,569.

BACKGROUND OF THE INVENTION (1) Field of the Invention

This invention relates to agriculture, more specifically to the distribution of treating liquid onto growing plants.

(2) Description of the Prior Art

In modern agriculture, it is often desirable to treat plants with certain liquids. E.g., at certain times it is desirable to apply insecticides to plants. In other situations, it is desirable to apply growth stimulants directly to the foliage of plants. The most common application is herbicides to weeds.

Previous applicators of herbicides to weeds have been primarily by having a unit which senses the presence of the weed, and responsive to that presence operates a spray so that herbicide is sprayed from a nozzle onto the weed. The weed may be detected by a photoelectric cell as shown by ROSE, U.S. Pat. No. 3,609,913. Others have suggested a mechanical finger to feel the weed such as GARDNER, U.S. Pat. No. 3,016,653. ALLEN, U.S. Pat. No. 3,959,924, has suggested a device to measure the electrical conductivity between a contact member and the ground which changes upon contact with a weed.

In certain instances selective herbicides have been used. I.e., herbicides which kill broad leaf plants and these herbicides leave grasses relatively uneffected. In such cases, the herbicide can be sprayed indiscriminately upon all the plants. In other instances, the selective herbicide can be mixed with a waxy substance and formed into a bar and this drug along a lawn or the like to kill broad leaf plants growing within a lawn.

Recently, there have come into commmercial use "rope wick applicators". These applicators provide a constant supply of liquid herbicide to the ends of a rope. Capillary action carries the liquid through the rope. Then, when the rope rubs against a weed, the liquid herbicide is applied to the weed. However, difficulty has been experienced with adjusting these so that there is sufficient herbicide applied to the rope so that the rope is always moist and capable of applying herbicide to the weed, yet, to prevent an over supply of herbicide being supplied to the rope so that the rope does not drip herbicide upon beneficial crops. Part of the problem is that weeds are not regularly spaced in a crop. I.e., there may be areas in the field where the weeds are very thick and there is a heavy removal of the herbicide from the ropes. In parts of the field there may be long spaces without weeds where there is no removal of herbicide from the rope. If there is a constant addition of herbicide to the rope, it may be seen that in certain areas of the field the rope will tend to become over supplied with liquid and in other portions of the field, the rope will tend to become under supplied with liquid.

SUMMARY OF THE INVENTION (1) New and Different Function

I have invented an applicator which applies the treatment liquid to the plant by rubbing a contact bar against the plant. Referring specifically to herbicide treatment, a contact bar, made of a permeable, absorbant, exudative material, such as a paint roller, is wet with liquid herbicide and rubbed against a plant. In this respect, the applicator functions similar to a rope wick applicator. However, in my invention the liquid on the contact bar is replenished by adding additional liquid to the contact bar each time liquid is withdrawn from the bar, i.e., each time the contact bar rubs against the plant, liquid is replenished into the bar. Liquid is added by either spraying the liquid onto the bar or applying liquid to the bar through a tube beneath the permeable, absorbant, exudative material.

In this way, I have avoided the problems inherent in the rope wick applicator. My replenishing supply of herbicide liquid to the contact bar is not constant but is provided only as needed.

This invention is particularly adaptable to treating weeds in edible food crops, such as peanuts, inasmuch as it is highly desirable not to contact any of the edible crop with the treatment liquid.

Therefore, it may be seen that the results of the combination are far greater than the sum of the functions of the individual elements such as valves, spray nozzles, microswitches, etc.

(2) Objects of the Invention

An object of this invention is to apply treatment liquid to plants.

Another object of this invention is to destroy weeds in a field in which crops are grown.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a perspective view of an embodiment of my invention upon a tractor in a field.

FIG. 2 is a perspective view of a single row unit of the embodiment shown in FIG. 1.

FIG. 3 is a side elevational view of a single unit of the embodiment shown in FIGS. 1 and 2.

FIG. 4 is a side elevational view of the single row unit of a second embodiment.

THE DESCRIPTION OF THE PREFERRED EMBODIMENTS

Referring to FIG. 1 there may be seen an agricultural tractor adapted to carry tool bar 10. Mounting brackets 12 are attached to the tool bar 10. The tractor forms a transportation means with the brackets thereon for moving the brackets 12 through agricultural fields with plants to be treated in a direction of travel "T", as seen by the arrow in the drawing. The tool bar 10 is vertically adjusted as are the brackets 12 on the tool bar.

Hose 14 extends along the tool bar. A tank or container (not shown) provides the hose 14 with the treatment fluid; which in the treatment of weeds would be a herbicide. Hose 14 is attached to solenoid valve 16 on each bracket. Thus, the hose 14 is a source of treatment liquid to the valve 16. Spring arm 18 is attached to the bracket 12. As illustrated, the spring arm is bolted by bolt 20 to the bracket 12. The spring arm 18 is made of a resilient material so that from its point of attachment by bolt 20 to the bracket 12 it can readily bend backwards. Microswitch 22 is attached to support arm 24 which is also attached to the bracket 12. Contact bar 26 is upon the bottom of the spring arm 18. The microswitch is very close to the spring arm 18 so that if the contact bar 26 is pushed back, as by a weed, the spring arm pushes against the microswitch 22 to close it.

Closing microswitch 22 opens valve 16. The microswitch 22 is connected to the valve 16 by electrical contacts that are part of the support arm 24. My previous patent application, Ser. No. 939,807, identified above, describes this with more detail. The solenoid valve 16 may be one of two types. First, it may be such a valve that remains open as long as the microswitch 22 is closed. Second, it may be of a plunger type, which when the microswitch 22 is closed gives one squirt or one adjustable slug of liquid regardless of whether the microswitch is closed only instantaneously or remains closed for two or three seconds. The type of valve 16 used is within the control of the operator. Referring again to the one shot type valve, this might be considered more of pump which, therefore, pumps out one slug of liquid each time it is activated. Of course, the amount of liquid in the single slug can be adjusted. The spring arm 18 and microswitch 26 are part of activating means for opening the valve 16 each time the contact bar 26 rubs against a plant.

The contact bar 26 is at an angle to the direction of travel "T". As illustrated, it is a horizontal bar normal to the direction of travel "T". Therefore, any weed or plant which extends above the ground a sufficient height to contact the bar 26 will rub against the bar. It may be understood that the contact bar could be at an angle to the direction of travel "T" so that a weed would wipe along the bar rather than contact it only once. Also, the bar could be at some position other than horizontal to describe some other outline or location of weeds that it would contact rather than height alone. It will be understood that normally the crop would be planted in a row having a definite silhouette or outline and anything outside of this silhouette or outline will be subject to application of the treatment material, as in this case the herbicide. The contact bar is of permeable, absorbant, exudative material. It is absorbant so that when treatment liquid, such as herbicide, is applied to it the liquid is absorbed into the contact bar. It is permeable so that the liquid will move within the contact bar to become evenly distributed along the bar. If more liquid is withdrawn from some portion of the bar than others, the liquid will move through the permeable bar to the drier portions thereof. Likewise, if the liquid is not supplied to the bar in an even fashion, the bar being permeable, liquid will migrate along the bar to the drier parts. The bar is exudative so that when the bar wipes or rubs against a plant there will be a transfer of liquid from the material of the contact bar to the plant.

Materials which are suitable for this are blotter type material such as fabric or sponge or cellular material such as expanded synthetic rubber material. One suitable material is fabric material such as paint rollers are made from.

In FIGS. 1, 2 and 3, spray nozzle 28 is fluidly and structurally attached to valve 16. The nozzle is such that it produces a fan shaped spray so that the jet of liquid or the fan like discharge from the nozzle will strike the contact bar 26 only and also will strike the contact bar evenly from end to end. Such spray nozzles are commercially upon the market. Thus the spray nozzle 28 is a replenishing means for replenishing liquids from valve 16 onto bar 26.

In the embodiments of FIGS. 1, 2 and 3, the contact bar 26 is in the form of a paint roller. It is mounted for rotation about its axis upon the spring arm 18. Therefore, each time it contacts a plant, the contact bar 26 tends to roll so that the foliage of the plant is blotted or the treatment is supplied to it in this manner. As the term "rub" is used in this application, it is meant to include the blotting or daubing upon the plant.

In operation, the farmer, once having positioned his tractor to begin applying the herbicide or other treatment liquid, can manually push each contact bar 26 backwards so that the spring arm 18 pushes against the microswitch 22 sufficiently to actuate the valve 16 thereby spraying the herbicide upon the contact bars. This initially loads the contact bar with the liquid. It will be understood that the microswitch and the associated connected wiring of the arm 24 and the solenoid actuator of the valve 16 are all parts of activating means interconnecting the contact bar 26 and the valve to open the valve responsive to the contact bar rubbing a plant.

After each of the contact bars are loaded, the farmer would drive the tractor along the field in a direction of travel "T". Thereafter, each time the contact bar rubbed against a plant it would exude liquid onto the plant. The bar would be replenished with a supply of liquid from the spray nozzle. The contact bar moves only a fraction of an inch and, therefore, would never move out of the way of the jet or fan of spray from the nozzle 28.

It will be understood that the important criteria for the invention is that the treatment liquid be replenished each time the contact bar rubs a plant. The simpliest way to achieve this result is to mount the contact bar 26 upon the spring arm 18. However, those having ordinary skill in the art will understand that the contact bar 26 could be mounted upon a separate support such as support arm 24 and would contact the plant. Of course, in such an event it would be necessary to have a different detection element to detect the presence of weed which could be of any type detection element as described in the prior art above. Even if a contact finger was used, it could be mounted upon the spring arm 18 adjacent the microswitch even though the contact bar 26 were mounted upon a separate support.

As seen, each spring arm 18 carries ear 30 on the back thereof about the position of the contact bar 26. Pitman 32 is pivoted to the ear 30 and extends upward through clip 34 attached to the bracket 12. Jam nuts 36 on the pitman 32 on either side of the clip 34 limit the travel of the pitman and, thus, because of the triangulation between the pitman and the spring arm 18 limit the travel of the spring arm. This travel limitation prevents a large or strong plant from pushing the spring arm back excessively so that it would cause it to vibrate. I.e., move forward and back again against the microswitch 22.

FIG. 4 shows a second embodiment. In this instance, the bracket 12, hose 14, valve 16, spring arm 18, bolts 20, microswitch 22, support arm 24, ear 30, pitman 32, clip 34 and jam nut 36 are basically the same as shown in the previous embodiment. However, in this instance instead of having a spray nozzle attached to the solenoid valve 16, conduit 38 is attached to the valve 16 and the conduit leads to perforated tube 40 which extends along contact bar support 42. The support 42 is covered on its forward and lower side with permeable, absorbant, exudative material 44, thus forming a composite contact bar. It may be seen that much of the operation of the embodiment is the same as that described above. In the embodiment shown in FIG. 4, the replenishing means, attached to the bracket for placing a liquid onto the contact bar, includes the perforated tube 40 in this instance instead of the spray nozzle 28 as in the previous embodiment. The composite contact bar, including support 42 and material 44, does not rotate and thus the rubbing operation is a wiping function more than rolling contact. The pitman also prevents the spring arm to be moved so far as would result in damage thereto.

As an aid to correlating the terms of the claims to the exemplary drawing, the following catalog of elements is provided:

| T - Direction of Travel | | | |
|---|---|---|---|
| 10 | tool bar | 28 | spray nozzle |
| 12 | brackets | 30 | ear |
| 14 | hose | 32 | pitman |
| 16 | valve | 34 | clip |
| 18 | spring arm | 36 | jam nuts |
| 20 | bolts | 38 | conduit |
| 22 | microswitch | 40 | tube |
| 24 | support arm | 42 | support |
| 26 | contact bar | 44 | material |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. An agricultural device for treating plants by applying treatment liquid thereto comprising in combination;
   a. a source of treatment liquid,
   b. a mounting bracket,
   c. transport means with the bracket thereon for moving the bracket through an agricultural field of plants to be treated,
   d. a contact bar of permeable, absorbant, exudative material mounted on the mounting bracket to rub against plants to be treated,
   e. replenishing means attached to the mounting bracket for placing liquid onto the contact bar,
   f. a valve connecting the replenishing means to the source of treatment liquid, and
   g. activating means activatingly connected to the valve for opening the valve each time the contact bar rubs a plant,
   h. said activating means including:
      i. a spring arm connecting the contact bar to the mounting bracket, and
      ii. a microswitch attached to the mounting bracket close to the spring arm.

2. The invention as defined in claim 1 further comprising:
   j. a pitman extending from the spring arm to
   k. a clip on the bracket, and
   l. jam nuts on the pitman on either side of the clip.

* * * * *